United States Patent
Chasdai et al.

(10) Patent No.: US 11,627,074 B1
(45) Date of Patent: Apr. 11, 2023

(54) NETWORK DEVICE WITH REAL-TIME DATA-PATH OPTIMIZATION

(71) Applicant: MELLANOX TECHNOLOGIES, LTD., Yokneam (IL)

(72) Inventors: Yair Chasdai, Tel Aviv (IL); David Daniel Pilnik, Rishon LeZion (IL); Maty Golovaty, Tel Aviv (IL); Liran Daniel, Beer Yaakov (IL); Ran Sandhaus, Tel Aviv (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 0 days.

(21) Appl. No.: 17/582,040

(22) Filed: Jan. 24, 2022

(51) Int. Cl.
*H04L 45/00* (2022.01)
*H04L 45/121* (2022.01)
*H04L 45/42* (2022.01)

(52) U.S. Cl.
CPC .......... *H04L 45/38* (2013.01); *H04L 45/121* (2013.01); *H04L 45/22* (2013.01); *H04L 45/42* (2013.01)

(58) Field of Classification Search
CPC ....... H04L 45/38; H04L 45/121; H04L 45/22; H04L 45/42
See application file for complete search history.

(56) References Cited

U.S. PATENT DOCUMENTS

| | | | | |
|---|---|---|---|---|
| 8,516,586 | B1 * | 8/2013 | Jensen | H04L 63/1425 713/153 |
| 2004/0025044 | A1 * | 2/2004 | Day | H04L 63/1408 726/23 |
| 2006/0019679 | A1 | 1/2006 | Rappaport et al. | |
| 2006/0294220 | A1 * | 12/2006 | Asahara | H04L 43/16 709/224 |
| 2007/0008884 | A1 * | 1/2007 | Tang | H04L 9/40 370/230 |

(Continued)

OTHER PUBLICATIONS

Zhu et al., "Congestion Control for Large-Scale RDMA Deployments", SIGCOMM'15, London, UK, pp. 523-536, Aug. 17-21, 2015.

(Continued)

*Primary Examiner* — Chris Parry
*Assistant Examiner* — Dixon F Dabipi
(74) *Attorney, Agent, or Firm* — Kligler & Associates Patent Attorneys Ltd

(57) ABSTRACT

A network device includes at least one port, a memory, data-path circuitry, and a processor. The at least one port is to exchange packets with a network. The data-path circuitry is to process the packets. The memory is to store signatures of traffic patterns according to a locality-sensitive signature function., and corresponding parameter settings for the data-path circuitry. The processor is to assess a current traffic pattern of the packets, to calculate a current signature over the current traffic pattern using the locality-sensitive signature function, to query the memory using the current signature, to configure the data-path circuitry, in response to finding a stored signature that is within a specified distance from the current signature, with a parameter setting that corresponds to the found signature, and take an alternative action in response to finding that no stored signature is within the specified distance from the current signature.

15 Claims, 3 Drawing Sheets

(56) References Cited

U.S. PATENT DOCUMENTS

| | | | |
|---|---|---|---|
| 2008/0049626 A1* | 2/2008 | Bugenhagen | H04N 21/6437 370/389 |
| 2013/0083806 A1* | 4/2013 | Suarez Fuentes | H04L 67/306 370/465 |
| 2014/0164640 A1 | 6/2014 | Ye et al. | |
| 2016/0285966 A1* | 9/2016 | Brech | H04L 41/0893 |
| 2017/0366398 A1 | 12/2017 | Mizrachi | |
| 2020/0236038 A1 | 7/2020 | Liu et al. | |
| 2020/0267053 A1 | 8/2020 | Zheng et al. | |
| 2021/0273869 A1 | 9/2021 | Tourrilhes et al. | |

OTHER PUBLICATIONS

Whitley, "A Genetic Algorithm Tutorial", Statistics and Computing, vol. 4, issue 2, pp. 1-37, year 1998.

Infiniband Trade Association, "InfiniBand Architecture Specification", vol. 1, release 1.2.1, pp. 1-1727, Nov. 2007.

Bilal et al., "Towards automatic parameter tuning of stream processing systems", Proceedings of the 2017 Symposium on Cloud Computing, pp. 189-200, year 2017.

Heinze et al., "Online parameter optimization for elastic data stream processing", Proceedings of the Sixth ACM Symposium on Cloud Computing, pp. 276-287, year 2015.

Herodotou et al., "A survey on automatic parameter tuning for big data processing systems", ACM Computing Surveys, vol. 53, No. 2, article 43, pp. 1-37, Apr. 2020.

Trotter et al., "Into the storm: Descrying optimal configurations using genetic algorithms and bayesian optimization", IEEE 2nd International Workshops on Foundations and Applications of Self* Systems (FAS*W), pp. 175-180, year 2017.

Wang et al., "A novel method for tuning configuration parameters of spark based on machine learning", IEEE 18th International Conference on High Performance Computing and Communications, pp. 586-593, year 2016.

Ye et al., "A recursive random search algorithm for large-scale network parameter configuration", Proceedings of the ACM SIGMETRICS International Conference on Measurement and Modeling of Computer Systems, pp. 196-205, year 2003.

Wikipedia, "Real-time," pp. 1-2, last edited Nov. 21, 2020, as downloaded from https://en.wikipedia.org/wiki/Real-time.

Gilboa et al., U.S. Appl. No. 17/129,978, filed Dec. 22, 2020.

U.S. Appl. No. 17/129,978 Office Action dated Mar. 16, 2022.

* cited by examiner

NETWORK DEVICE WITH REAL-TIME DATA-PATH OPTIMIZATION

FIELD OF THE INVENTION

The present invention relates generally to network communication, and particularly to real-time adaptation of data-path parameters network devices.

BACKGROUND OF THE INVENTION

Network devices, such as packet switches, network adapters and active cables, typically comprise ports and associated data-path circuitry. The data-path circuitry coupled to a port may comprise, for example, buffers, queues and/or flow-control circuitry.

SUMMARY OF THE INVENTION

An embodiment of the present invention that is described herein provides a network device including at least one port, a memory, data-path circuitry, and a processor. The at least one port is to exchange packets with a network. The data-path circuitry is to process the packets exchanged via the at least one port. The memory is to store (i) signatures of traffic patterns according to a locality-sensitive signature function, and (ii) corresponding parameter settings for the data-path circuitry. The processor is to assess a current traffic pattern of the packets exchanged via the at least one port, to calculate a current signature over the current traffic pattern using the locality-sensitive signature function, to query the memory using the current signature, to configure the data-path circuitry, in response to finding a stored signature that is within a specified distance from the current signature, with a parameter setting that corresponds to the found signature, and take an alternative action in response to finding that no stored signature is within the specified distance from the current signature.

In an embodiment, the signatures include respective vectors of parameters of the traffic patterns. In a disclosed embodiment, the parameter settings are sorted in the memory according to the respective signatures, and the processor is to query the memory by (i) initially accessing in the memory location that stores a signature that exactly matches the current signature, (ii) when finding a stored signature that exactly matches the current signature, retrieving the parameter setting that corresponds to the exactly matching signature, and (iii) when failing to find a stored signature that exactly matches the current signature, retrieving a parameter setting that corresponds to a signature that is closest in the memory to the initially accessed location.

In an example embodiment, in response to finding that no stored signature is within the specified distance from the current signature, the processor is to obtain a parameter setting that is suitable for the current traffic pattern, and to store the current signature and the estimated parameter setting in the memory.

In some embodiments, the locality-sensitive signature function a locality-preserving hash function. In an embodiment, the parameter settings are sorted in the memory according to the respective signatures, and the processor is to query the memory by accessing a memory location that depends on the current signature.

In some embodiments, the parameter settings specify at least one of (i) one or more buffer management parameters of a buffer in the data-path circuitry, (ii) one or more queue management parameters of a queue in the data-path circuitry, (iii) one or more flow-control parameters of a flow-control mechanism applied by the data-path circuitry, (iv) one or more control-path logic parameters, and (v) one or more telemetry and status logic parameters.

There is additionally provided, in accordance with an embodiment that is described herein, a method for configuring data-path circuitry in a network device. The method includes processing packets, which are exchanged via at least one port of the network device, using the data-path circuitry. Signatures of traffic patterns according to a locality-sensitive signature function, and corresponding parameter settings for the data-path circuitry, are stored in a memory. A current traffic pattern, of the packets exchanged via the at least one port, is assessed. A current signature is calculated over the current traffic pattern, using the locality-sensitive signature function. The memory is queried using the current signature. In response to finding a stored signature that is within a specified distance from the current signature, the data-path circuitry is configured with a parameter setting that corresponds to the found signature. In response to finding that no stored signature is within the specified distance from the current signature, an alternative action is taken.

There is further provided, in accordance with an embodiment that is described herein, a method including finding multiple parameter settings for processing multiple respective traffic patterns by a data-path of a network device. Respective signatures of the traffic patterns are calculated using a locality-sensitive signature function. The signatures and the corresponding parameter settings are stored in a memory, for use by the network device.

There is also provided, in accordance with an embodiment that is described herein, a method for configuring a network device. The method includes storing in a memory (i) signatures of traffic patterns according to a locality-sensitive signature function, and (ii) corresponding parameter settings for data-path circuitry of the network device. A current traffic pattern, of packets received and/or transmitted via at least one port of the network device, is assessed. A current signature is calculated over the current traffic pattern, using the locality-sensitive signature function. In. response to finding, in the memory, a stored signature that is within a specified distance from the current signature, the data-path circuitry is configured with a parameter setting that corresponds to the found signature.

The present invention will be more fully understood from the following detailed description of the embodiments thereof, taken together with the drawings in which:

DETAILED DESCRIPTION OF EMBODIMENTS

Overview

Figure 1:
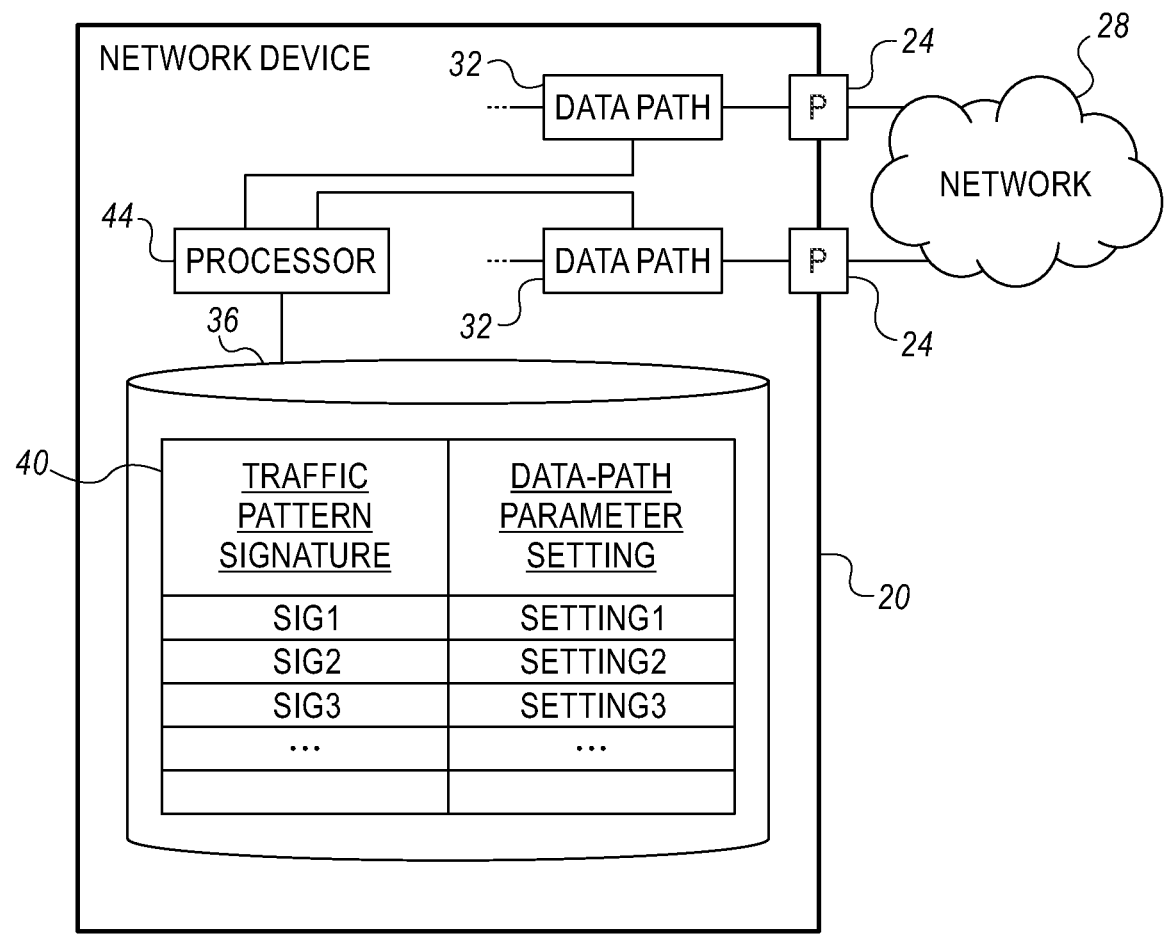
FIG. 1 is a block diagram that schematically illustrates a network device that employs real-time adaptation of data-path parameters, in accordance with an embodiment of the present invention.

Embodiments of the present invention that are described herein provide methods and systems for adaptation of data-path parameters in network devices. The disclosed techniques enable a network device to match the parameters of its data-path to the actual traffic pattern of the packets being currently processed by the data-path. Since traffic patterns tend to vary significantly over time, the disclosed techniques enable considerable improvement in performance measures such as throughput and latency.

In some embodiments, a network device comprises one or more ports and associated data-path circuitry. For a given port, the data-path circuitry may comprise components such as receive buffers and/or queues, transmit buffers and/or queues, and/or flow-control circuitry such as credit management or pause-resume management circuits. The data-path components are typically configurable.

One example of reconfiguring a data-path component comprises modifying the dynamic size quota parameter of a port—A parameter specifying the amount of buffer memory available for the port to use for storing packets. Configuring the dynamic size quota, e.g., as a function of the current congestion that the port is experiencing, prevents the port from dropping packets, or steps out of congestion state. Another example has to do with optimizing parameters related to flow-control, e.g., changing the XOFF-threshold. This parameter defines the buffer occupancy at which the device should start sending pause packets. Adaptively configuring the XOFF-threshold enables better end-to-end flow-control performance.

The set of parameters that defines the configuration of the data-path circuitry is referred to herein as a "parameter setting."

In some embodiments, the network device comprises a memory, which stores a database of alternative parameter settings for the data-path circuitry. Each parameter setting in the database was found to be suitable (e.g., optimal) for handling a certain respective traffic pattern. Techniques for constructing the database, e.g., using an Artificial Intelligence (AI) model or by other means, are described below.

The network device further comprises a processor that assesses the current traffic pattern on a certain port, and queries the database to find a parameter setting that matches the current traffic pattern. If a suitable parameter setting is found, the processor configures the data-path circuitry of the port with the matching parameter setting. The processor typically performs this process on an on-going basis, so as to continually match the parameters of the data-path circuitry to the current traffic pattern.

In some embodiments, the database as accessed efficiently by using locality-sensitive signatures of traffic patterns. In these embodiments, a traffic pattern is represented by a list of values (also referred to as a "vector" or values). The vector may comprise any suitable value that is indicative of the traffic pattern, e.g., ingress port bandwidth, ingress port burstiness (bandwidth variance), port mapping, latency, ingress jitter, ingress buffers occupancy, number of enabled ports, number of flows in the network device, Access Control Lists (Act), etc. A locality-preserving signature function is defined over traffic patterns, and a distance metric defined between locality-preserving signatures.

The signature function is "locality-preserving" in the sense that it maps similar traffic patterns to signatures having a small distance from one another. By the same token, dissimilar traffic patterns are mapped to signatures separated by a large distance.

One example of a locality-preserving signature function is a Locality-Sensitive Hashing (LSH) function. Another example is the unity function, i.e., using the traffic pattern vector itself as a signature. One example of a distance metric is the Euclidean or Root-Mean-Square (BES) distance between signatures.

The description that follows refers to locality-sensitive signatures as simply "signatures" for brevity. The database is also referred to herein as a "signature database."

In some embodiments, each entry of the database comprises (i) a locality-sensitive signature of a certain traffic pattern, and (ii) a data-path parameter setting that was found suitable (e.g., optimal) for handling that traffic pattern. The processor of the network device queries the database by (i) calculating a current signature over the current traffic pattern assessed on a port, and (ii) attempting to find in the database a stored signature that is within a specified distance from the current signature.

A "matching signature" in this context is not necessarily an exact match. An approximately matching signature is also considered a match, provided that it is within the specified distance from the current signature. If a matching signature is found in the database, the processor configures the data-path circuitry with the corresponding parameter setting. If no match is found, the processor takes some alternative action, e.g., retains the existing parameter setting.

In some cases, the signatures can be mapped onto a one-dimensional axis, or in other words, a numerical value (also referred to as "signature value") can be associated with each signature. This mapping sets a monotonic order among the signature values. In some embodiments, the entries of the database are sorted in the memory according to a monotonic (ascending or descending) order of the signature values. Sorting the database in this manner enables the processor to query the database with high efficiency— Several examples are described herein.

System Description

FIG. 1 is a block diagram that schematically illustrates a network device 20 that employs real-time adaptation of data-path parameters, in accordance with an embodiment of the present invention. In the present context, the term "real-time" means that the data-path parameters are configured during live operation of the network device, and that the configuration depends on the actual traffic pattern of packets being processed by the network device.

Network device 20 may comprise, for example, a packet switch or router, a network adapter such as a Network Interface Controller (NIC) or Host Channel Adapter (HCA), an active cable, or any other suitable type of network device. Network device 20 may operate in accordance with any suitable network protocol, e.g., Ethernet or Infiniband™.

Network device 20 comprises one or more ports 24 for exchanging (transmitting and/or receiving) packets with a network 28, and data-path circuitry 32 for processing the received and/or transmitted packets. A network adapter or active cable will typically have one or two ports 24, whereas a switch will typically have multiple ports 24. In the example of FIG. 1, each port 24 is coupled to a respective data-path circuitry 32. This one-to-one relationship, however, is in no way mandatory. For example, some data-path components may be shared among multiple ports 24. One example of a shared component is a shared buffer whose resources are assigned adaptively, e.g., on-demand, to ports 24.

For a given port 24, data-path circuitry 32 may comprise one or more of the following components:
One or more receive buffers, for storing headers and/or payloads of packets received via the port.

One or more transmit buffers, for storing headers and/or payloads of packets to be transmitted via the port.

One or more queues, e.g., work queues and/or completion queues, for storing Work-Queue Elements WQEs) and/or Completion-Queue Elements (CQEs) indicative of processing of packets communicated via the port.

Flow-control circuitry for controlling the flow of packets between the port and network 28. Depending on the applicable network protocol, the flow-control circuitry may comprise, for example, pause-resume management circuitry (e.g., XON/XOFF) or credit management circuitry.

Control-path logic to classify and perform forwarding decisions on received packets.

Telemetry and status logic, such as performance counters, occupancy and latency histograms.

The various components of data-path circuitry 32 are typically configurable. For example, configurable data-path parameters may comprise one or more of the following:

Queue and/or buffer management parameters, for example quotas for memory allocation to a queue or buffer.

Flow-control management parameters, such as XON/XOFF thresholds.

Control-path logic parameters.

Telemetry and status logic parameters.

The set of parameters that defines the configuration of data-path circuitry 32 for a given port 24 is referred to herein as a "parameter setting."

Network device 20 further comprises a processor 44 that, possibly among other tasks, assesses the traffic patterns on the various ports 24 and configures the corresponding data-path circuitry 32 with parameter settings that match the traffic patterns. For this purpose, network device 20 comprises a memory 36 that stores a signature database 40.

Database 40 comprises multiple entries, each entry compromising:

A locality-sensitive signature of a certain traffic pattern (denoted SIG1, SIG2, SIG3, . . . in the figure).

A parameter setting that was found suitable (e.g., optimal) for handling that traffic pattern in data-path circuitry 32 (denoted SETTING1, SETTING2, SETTING3, . . . in the figure).

Example techniques for constructing database 40 are discussed with reference to FIG. 3 further below. Database 40 is typically constructed offline and provided to network device 20, e.g., over the network. In some embodiments, although not necessarily, processor 44 is also capable of adding new entries to database 40.

The configuration of network device 20 shown in FIG. 1 is an example configuration that is chosen purely for the sake of conceptual clarity. Any other suitable configuration can be used in alternative embodiments. In various embodiments, network device 20 and its various components can be implemented using hardware, e.g., using one or more Application-Specific Integrated Circuits (ASIC) and/or Field-Programmable Gate Arrays (FPGA), using software, or using a combination of hardware and software components. Memory 36 may comprise any suitable type of volatile memory (e.g., RAM) or non-volatile memory (e.g., Flash).

In some embodiments, processor 44 comprises a general-purpose processor, which is programmed in software to carry out the functions described herein. The software may be downloaded to the processor in electronic form, over a network, example, or it may, alternatively or additionally, be provided and/or stored on non-transitory tangible media, such as magnetic, optical, or electronic memory.

Figure 2:
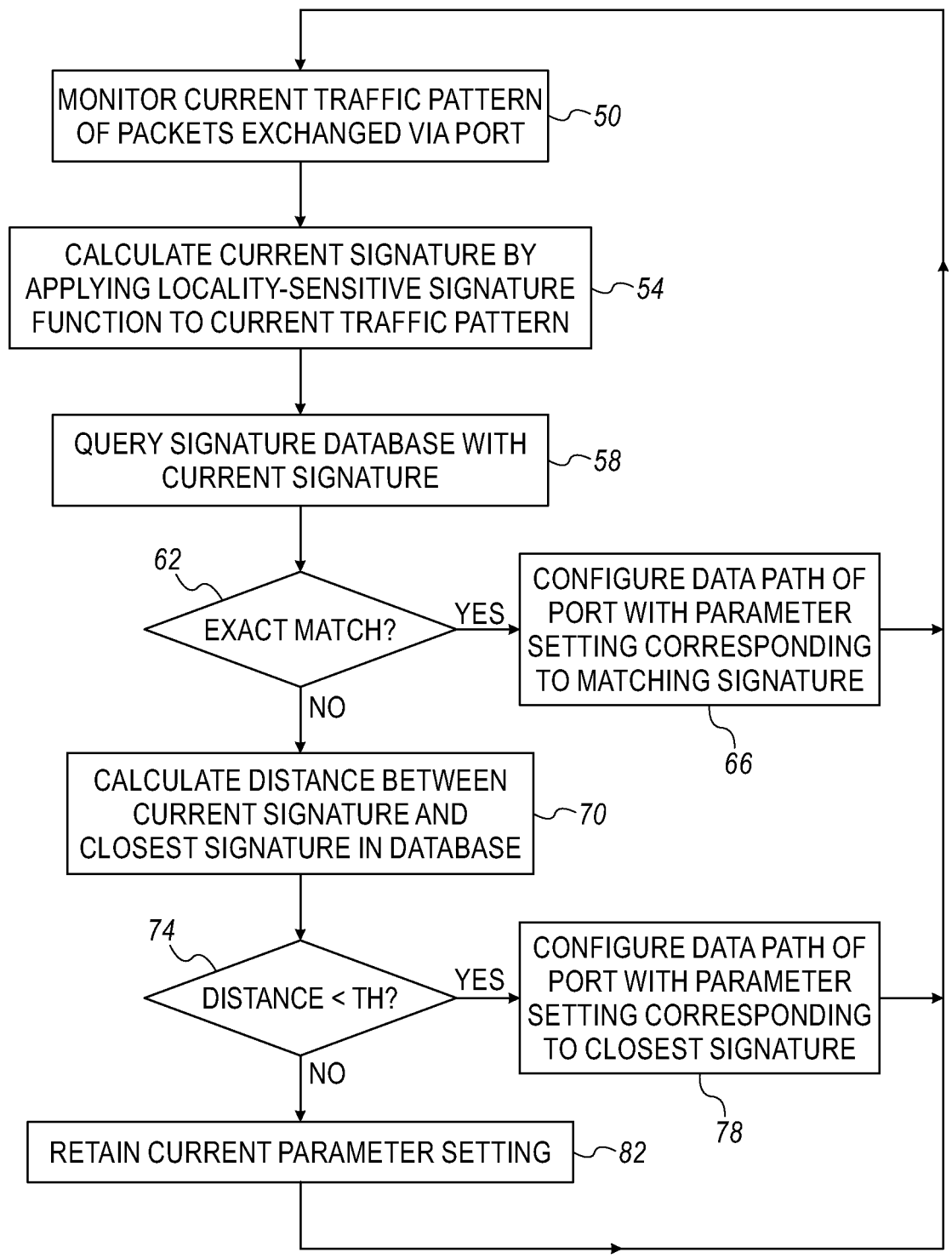
FIG. 2 is a flow chart that schematically illustrates a method for real-time adaptation of data-path parameters in a network device, in accordance with an embodiment of the present invention.

Real-Time Adaption of Data-Path Parameters, and Database Access Using Locality-Sensitive Signatures FIG. 2 is a flow chart that schematically illustrates a method for real-time adaptation of data-path parameters in network device 20, carried out by processor 44, in accordance with an embodiment of the present invention. The method description that follows refers to a particular port 24, for simplicity. In practice, processor 44 may perform such a method for multiple ports 24 of the network device, e.g., for all ports.

For a given port 24, the method begins with processor 44 monitoring the current traffic pattern of the packets exchanged between the port and network 28, at a traffic assessment stage 50. Processor 44 represents the traffic pattern by a vector of values. As noted above, the vector may comprise values such as ingress port bandwidth, ingress port burstiness (bandwidth variance), port mapping, latency, ingress jitter, ingress buffers occupancy, number of enabled ports, number of flows in the network device, ACLs, and the like. Additionally or alternatively, any other suitable attributes of the traffic pattern can be included.

At a signature calculation stage 54, processor 44 calculates a locality-sensitive signature over the vector that represents the current traffic pattern. Any suitable locality-sensitive signature function can be used for this purpose, such as a LSH function. In one embodiment, the vector assessed at stage 50 is used as-is as a signature. The signature function used for calculating the current signature is the same function that was used for calculating the signatures in database 40.

At a database querying stage 58, processor 44 queries database 40 with the current signature (the signature of the current traffic pattern).

At an exact-match checking stage 62, processor 44 checks whether any of the stored signatures in database 40 is an exact match to the current signature. If an exact match is found, processor 44 configures data-path circuitry 32 of port 24 with the stored parameter setting that corresponds to the matching signature, at an exact-match configuration stage 66. The method then loops back to stage 50, in which processor 44 continues to monitor the traffic pattern.

If an exact match is not found, processor 44 calculates the distance between the current signature and the closest signature in database 40 (the signature having the smallest distance to the current signature according to the defined distance metric), at a distance calculation stage 70.

At an approximate-match checking stage 74, processor 44 checks whether the distance between the current signature and the closest signature in database 40 is smaller than a defined distance threshold. If so, processor 44 configures data-path circuitry 32 of port 24 with the stored parameter setting that corresponds to the approximately matching signature, at an approximate-match configuration stage 78. The method then loops back to stage 50.

Otherwise, i.e., if no exact match and no approximate match are found, processor 44 retains the existing parameter setting of data-path circuitry 32, at a retaining stage 82. The method again loops back to stage 50, In other embodiments, processor 44 may take various alternative actions in response to failing to find a match (exact or approximate) to the current signature.

The method above is an example method that is chosen purely for the sake of conceptual clarity. In alternative embodiments, any other suitable method can be used for carrying out the disclosed technique. For example, processor 44 may choose the parameter setting whose signature is closest to the current signature, regardless of any threshold. In other words, the threshold or "specified distance" between the current signature and the sought stored signature may be set to an arbitrarily large value. In some embodiments, however, the threshold or "specified distance" is set to a value that excludes sortie of the entries in database 40.

As another example, processor 44 may issue an alert to an external device, or log an event in a log file, if a suitable parameter setting is not found.

Fast Database Access by Sorting the Signature Database

As noted above, in some cases the signatures can be mapped onto a one-dimensional axis, thereby setting a monotonic order among them. In other words, in some cases it is possible to assign a numerical value ("signature value") to each signature. For example, when the signature comprises N bits (e.g., an N-bit hash value), the signatures can be ordered according to the magnitude of the N-bit binary number made-up of these bits.

In some embodiments, the entries of database 40 are sorted in memory 36 according to a monotonic (ascending or descending) order of the signature values. Sorting the database in this manner enables processor 44 to find a matching signature (or to conclude that the database does not contain a matching signature) efficiently.

For example, when the database is sorted, processor 44 can search the database for the closest match using a binary search process. The computational complexity of this process is o(logN), wherein N denotes the number of entries.

In other embodiments, processor 44 may begin (and possibly conclude) the query by accessing a memory location that depends on the current signature. For example, database 40 may be constructed as an array that is indexed by the signature value (e.g., hash value). In such an implementation, processor 44 accesses the database directly with the signature value. If the database contains an exact match, the corresponding entry will be stored at the accessed memory location. If not, the locality-sensitivity property of the signature function guarantees that the entry having the closest matching signature will be stored in a nearby memory location.

Thus, in some embodiments, processor 44 begins the query by accessing the memory location that is expected to store an exactly-matching signature, if one exists in database 40. If an exact match is found, processor 44 retrieves the parameter setting that corresponds to the exactly-matching signature and configures data-path circuitry 32 is setting. If no exact match is found, processor 44 proceeds to the signature that is closest in the memory to the initially accessed location, and uses the corresponding parameter setting for configuring the data-path circuitry. Alternatively, if no exact match is found, processor 44 may revert to scan the database using binary search, or using some other search process.

In alternative embodiments, processor 44 may use any other suitable technique that accesses a memory location that depends on the current signature, exploiting the fact that database 40 is sorted according to the signature values.

Note, however, that sorting of the database is by no means mandatory for carrying out the disclosed techniques.

Construction of the Signature Database

Figure 3:
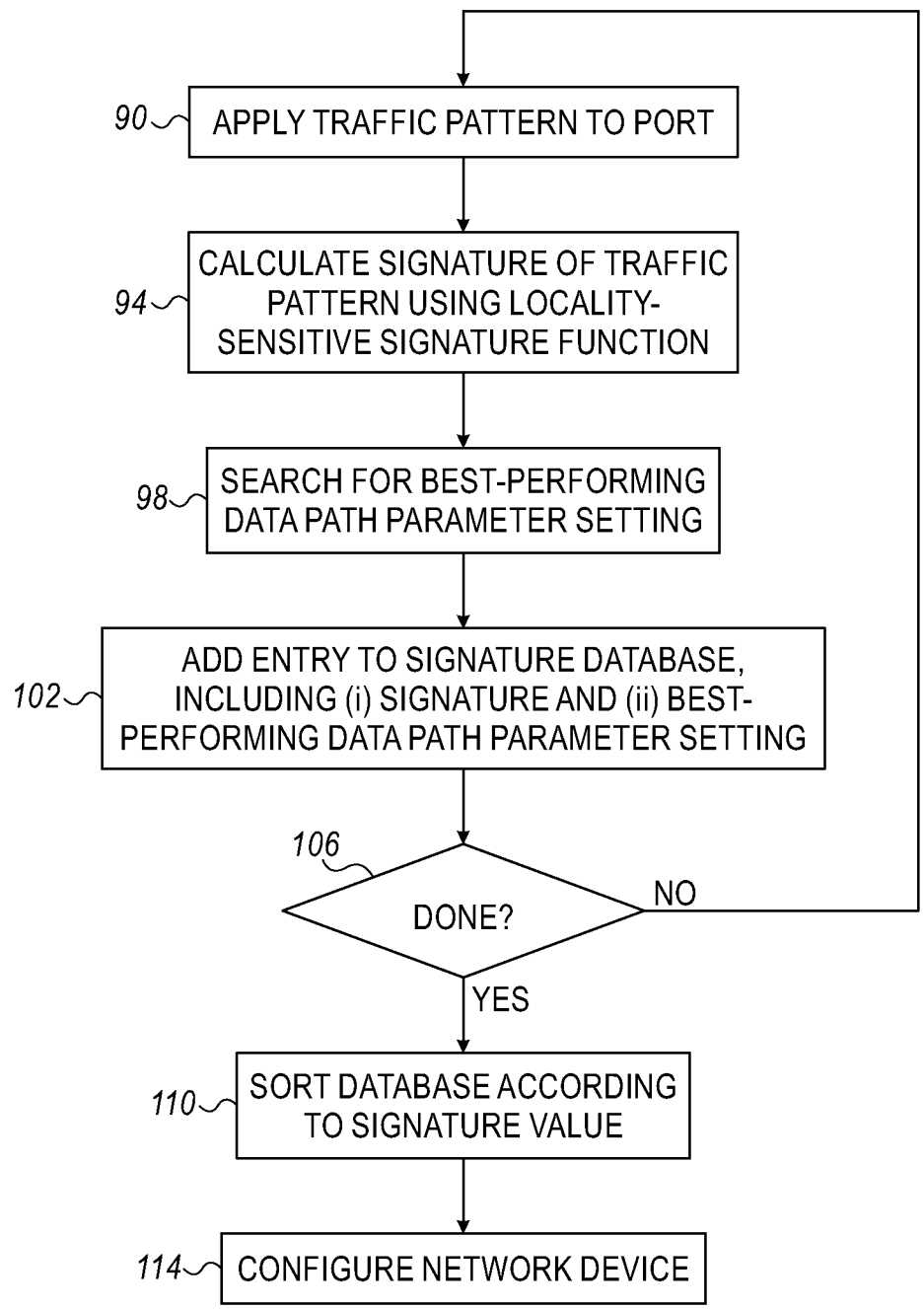
FIG. 3 is a flow chart that schematically illustrates a method for constructing a signature database for a network device, in accordance with an embodiment of the present invention.

FIG. 3 a flow chart that schematically illustrates a method for constructing signature database 40 for use by network device 20, in accordance with an embodiment of the present invention. Typically, database 40 is constructed offline by a processor of a computer external to network device 20, stored in a memory of that computer, and then provided to network device 20, e.g., over network 28. In other embodiments, however, database 40 may be constructed by processor 44 in the network device and stored directly in memory 36. Hybrid implementations, e.g., in which the database is initially constructed by an external computer and later updated by processor 44, are also contemplated. For clarity, the method description will refer to "a processor" that constructs the database and to "a memory" that stores the database.

In principle, the method of FIG. 3 involves applying multiple different traffic patterns to a data-path 32, either in a simulation environment or in a real-life network device. For each traffic pattern, the best-performing parameter setting is found, and a database entry is created, comprising (i) the best-performing parameter setting and (ii) the signature of the traffic pattern.

The method begins with the processor applying a traffic pattern, at a pattern application stage 90. At a signature calculation stage 94, the processor calculates the (locality-sensitive) signature of the traffic pattern.

At a parameter-setting calculation stage 98, the processor searches for an optimal parameter setting, i.e., a parameter setting that, when configured in data-path circuitry 32, provides optimal performance in handling the traffic pattern being evaluated.

In various embodiments, the processor may use various criteria for quantifying the performance of parameter settings. The criteria may aim to optimize various performance measures, for example minimal latency, maximal throughput, minimal probability of congestion, minimal probability of packet drop, minimal XOFF time, minimal buffer fill level ("watermark"), minimal queue occupancy, and/or any other suitable criteria or target function. The processor may use a single performance measure or a suitable weighted combination of multiple performance measures. In some embodiments, the processor may give higher priority to a given performance measure over another.

The processor may also use various techniques for finding the optimal parameter setting for a given traffic pattern. In some embodiments the processor may train an Artificial Intelligence (AI) model to estimate the performance of various parameter settings. In other embodiments, the processor may use a grid search, a gradient search, a Bayesian optimization process, a genetic algorithm, or any other suitable algorithm for the best-performing parameter setting for handling the traffic pattern being evaluated.

At a database entry creation stage 102, the processor adds a new entry to database 40. The entry comprises (i) the best-performing parameter setting found at stage 98, and (ii) the signature of the traffic pattern calculated at stage 94.

At a completion checking stage 106, the processor checks whether all desired traffic patterns have been evaluated. If not, the method loops back to stage 90 above for evaluating the next traffic pattern.

When all desired traffic patterns have been evaluated, the processor (optionally) sorts the database according to the signature values, at a sorting stage 110. At an output stage 114, the processor configures network device 20 with the constructed database.

Although the embodiments described herein mainly address data-path circuitry network devices, the methods and systems described herein can also be used in various other systems whose performance can be optimized using parameters correlative to the system inputs.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A network device, comprising:
at least one port, to exchange packets with a network;
data-path circuitry, to process the packets exchanged via the at least one port;
a memory, to store (i) signatures of traffic patterns according to a locality-sensitive signature function, and (ii) corresponding parameter settings for the data-path circuitry; and
a processor, to:
assess a current traffic pattern of the packets exchanged via the at least one port;
calculate a current signature over the current traffic pattern, using the locality-sensitive signature function;
query the memory using the current signature;
in response to finding a stored signature that is within a specified distance from the current signature, configure the data-path circuitry with a parameter setting that corresponds to the found signature; and
in response to finding that no stored signature is within the specified distance from the current signature, take an alternative action.

2. The network device according to claim 1, wherein the signatures comprise respective vectors of parameters of the traffic patterns.

3. The network device according to claim 1, wherein the parameter settings are sorted in the memory according to the respective signatures, and wherein the processor is to query the memory by:
initially accessing in the memory a location that stores a signature that exactly matches the current signature;
when finding a stored signature that exactly matches the current signature, retrieving the parameter setting that corresponds to the exactly matching signature; and
when failing to find a stored signature that exactly matches the current signature, retrieving a parameter setting that corresponds to a signature that is closest in the memory to the initially accessed location.

4. The network device according to claim 1, wherein, in response to finding that no stored signature is within the specified distance from the current signature, the processor is to obtain a parameter setting that is suitable for the current traffic pattern, and to store the current signature and the estimated parameter setting in the memory.

5. The network device according to claim 1, wherein the locality-sensitive signature function is a locality-preserving hash function.

6. The network device according to claim 1, wherein the parameter settings are sorted in the memory according to the respective signatures, and wherein the processor is to query the memory by accessing a memory location that depends on the current signature.

7. The network device according to claim 1, wherein the parameter settings specify at least one of:
one or more buffer management parameters of a buffer in the data-path circuitry;
one or more queue management parameters of a queue in the data-path circuitry;
one or more flow-control parameters of a flow-control mechanism applied by the data-path circuitry;
one or more control-path logic parameters; and
one or more telemetry and status logic parameters.

8. A method for configuring data-path circuitry in a network device, the method comprising:
processing packets, which are exchanged via at least one port of the network device, using the data-path circuitry;
storing in a memory (i) signatures of traffic patterns according to a locality-sensitive signature function, and (ii) corresponding parameter settings for the data-path circuitry;
assessing a current traffic pattern of the packets exchanged via the at least one port;
calculating a current signature over the current traffic pattern, using the locality-sensitive signature function;
querying the memory using the current signature;
in response to finding a stored signature that is within a specified distance from the current signature, configuring the data-path circuitry with a parameter setting that corresponds to the found signature; and
in response to finding that no stored signature is within the specified distance from the current signature, taking an alternative action.

9. The method according to claim 8, wherein the signatures comprise respective vectors of parameters of the traffic patterns.

10. The method according to claim 8, wherein the parameter settings are sorted in the memory according to the respective signatures, and wherein to querying the memory comprises:
initially accessing in the memory a location that stores a signature that exactly matches the current signature;
when finding a stored signature that exactly matches the current signature, retrieving the parameter setting that corresponds to the exactly matching signature; and
when failing to find a stored signature that exactly matches the current signature, retrieving a parameter setting that corresponds to a signature that is closest in the memory to the initially accessed location.

11. The method according to claim 8, and comprising, in response to finding that no stored signature is within the specified distance from the current signature, obtaining a parameter setting that is suitable for the current traffic pattern, and storing the current signature and the estimated parameter setting in the memory.

12. The method according to claim 8, wherein the locality-sensitive signature function is a locality-preserving hash function.

13. The method according to claim 8, wherein the parameter settings are sorted in the memory according to the respective signatures, and wherein querying the memory comprises accessing a memory location that depends on the current signature.

14. The method according to claim 8, wherein the parameter settings specify at least one of:
- one or more buffer management parameters of a buffer in the data-path circuitry;
- one or more queue management parameters of a queue in the data-path circuitry;
- one or more flow-control parameters of a flow-control mechanism applied by the data-path circuitry;
- one or more control-path logic parameters; and
- one or more telemetry and status logic parameters.

15. A method for configuring a network device, the method comprising:
- storing in a memory (i) signatures of traffic patterns according to a locality-sensitive signature function, and (ii) corresponding parameter settings for data-path circuitry of the network device;
- assessing a current traffic pattern of packets received and/or transmitted via at least one port of the network device;
- calculating a current signature over the current traffic pattern, using the locality-sensitive signature function; and
- in response to finding, in the memory, a stored signature that is within a specified distance from the current signature, configuring the data-path circuitry with a parameter setting that corresponds to the found signature.

* * * * *